Nov. 27, 1956      A. F. SMITH      2,772,099
BUMPER MOUNTS FOR TRAILER HITCHES

Filed Feb. 19, 1954      2 Sheets-Sheet 1

*INVENTOR.*
ARTHUR F. SMITH
BY
*McMorrow, Berman & Davidson*
ATTORNEYS

Nov. 27, 1956 A. F. SMITH 2,772,099
BUMPER MOUNTS FOR TRAILER HITCHES
Filed Feb. 19, 1954 2 Sheets-Sheet 2
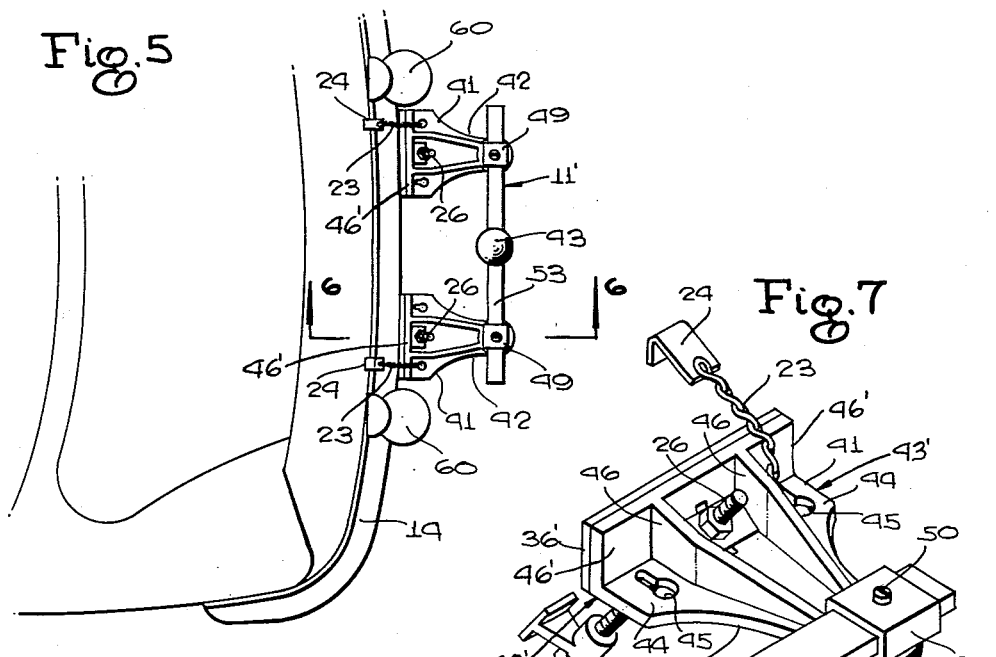
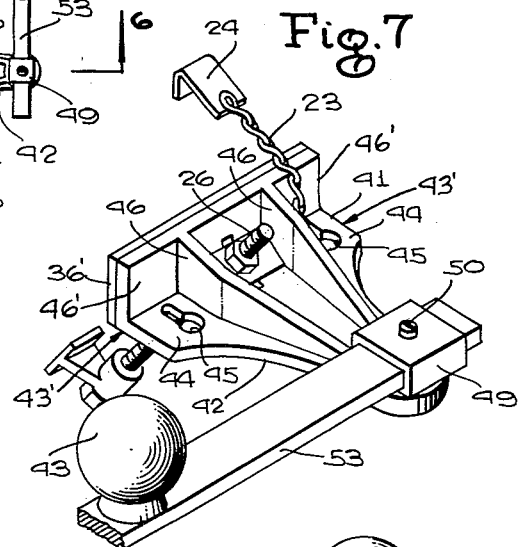
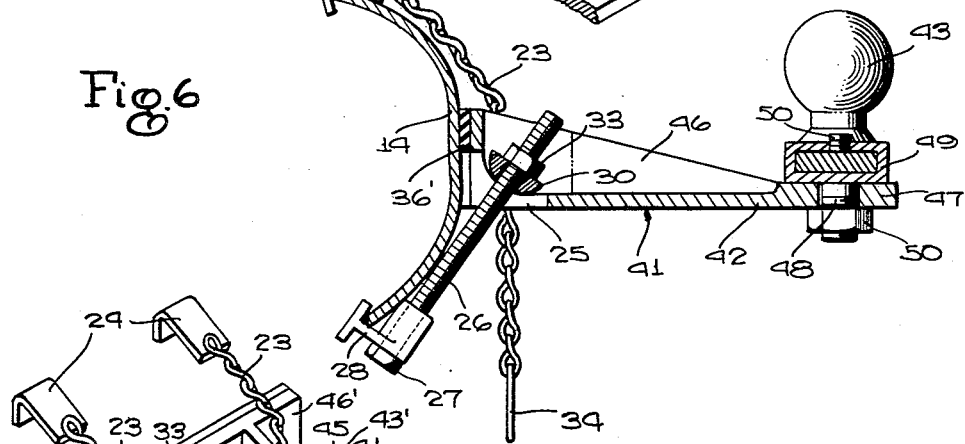
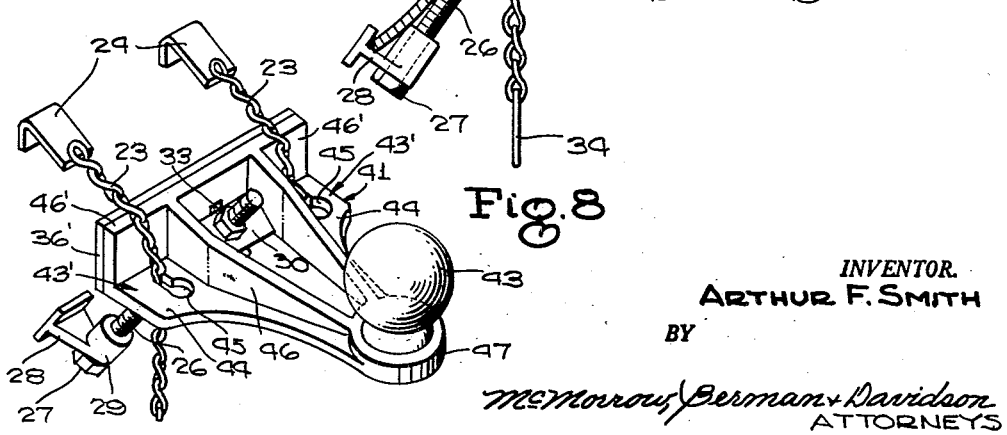
INVENTOR.
ARTHUR F. SMITH
BY
McMorrow, Berman & Davidson
ATTORNEYS

2,772,099

BUMPER MOUNTS FOR TRAILER HITCHES

Arthur F. Smith, Trenton, N. J.

Application February 19, 1954, Serial No. 411,298

2 Claims. (Cl. 280—502)

This invention relates to improvements in mounts for detachably connecting a trailer hitch to the rear bumper bar of an automobile.

A main object of the invention is to provide a novel and improved mount for a trailer hitch adapted to be detachably secured to the rear bumper of the automobile, the improved mount being simple in construction, being easy to install, and being adaptable for use with automobiles varying widely in design, and particularly in configuration of the rear bumper bar thereof.

A further object of the invention is to provide improved mounts of the character indicated which are inexpensive to manufacture, are sturdy in construction, and provide stable support for a trailer hitch ball.

Further objects and advantages of the invention will become apparent from the following description and claims, and from the accompanying drawings, wherein:

Figure 5 is a fragmentary top view of the rear portion of an automobile and its bumper bar, provided with another form of improved hitch mount according to the present invention.

Figure 6 is an enlarged cross sectional view taken on the line 6—6 of Figure 5.

Figure 7 is a fragmentary perspective view of the hitch mount of Figure 5; and,

Figure 8 is a perspective view of one of the members of the hitch mount of Figure 5, shown employed independently as a mount for a trailer hitch ball.

Figure 1:
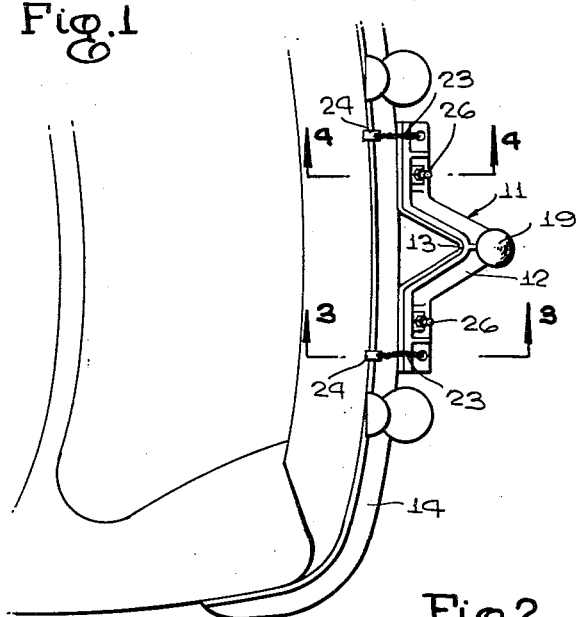
Figure 1 is a fragmentary top plan view of the rear portion of an automobile and its bumper bar, provided with one form of trailer hitch mount constructed in accordance with the present invention.

Referring to the drawings in detail, and first to Figures 1 to 4, the mount therein shown and generally designated 11 comprises a main body 12 which is preferably right angular in cross section and formed with a rearwardly offset portion 13. The central portion 13 may be V-shaped, as shown in Figure 1, or of other similar shape, such as U-shaped, in order to provide clearance for a central vertical bumper guard (not shown) frequently employed on the rear bumper bar of a motor vehicle. However, as shown in Figure 1, the body 12 may also be employed with equal facility with a rear bumper bar 14 not equipped with a vertical auxiliary central bumper element.

Figure 2:
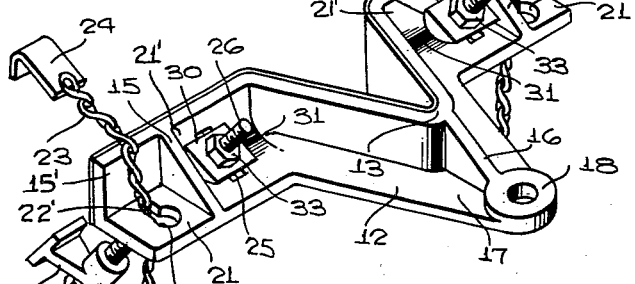
Figure 2 is an enlarged perspective view of the trailer hitch mount of Figure 1.

As shown in Figure 2, the main body 12 is formed with triangular reinforcing webs 15, 15 located on the opposite side arms 15', 15' thereof, and with a central reinforcing web 16 located at the apex of the intermediate offset portion 13.

The horizontal flange 17 of the offset intermediate portion 13 is formed at its rear end with the apertured boss 18 adapted to receive the threaded shank of a trailer hitch ball 19, the ball being secured to the boss by a suitable nut 20 threadably engaged on the lower portion of its shank and tightened against the under surface of flange 17.

Figure 4:
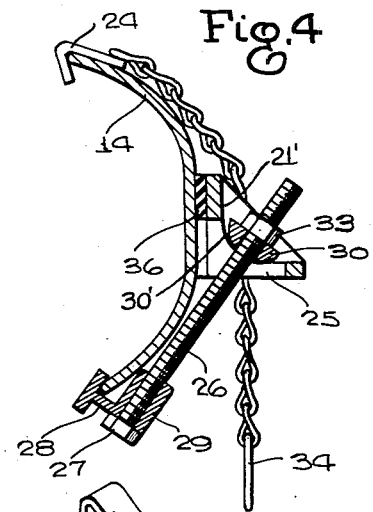
Figure 4 is an enlarged vertical cross sectional view taken on the line 4—4 of Figure 1.

The horizontal flange elements 21, 21 of the arms 15', 15' are formed outwardly of the webs 15 with keyhole slots 22, 22 through which depend the free ends of related chains 23, 23, said chains being of the twisted link type, as shown in Figure 2, whereby the chains may be lockingly engaged in the narrow forward slot portions 22' of the keyhole slots 22, 22. Connected to the top ends of the respective chains 23, 23 are the respective hook elements 24, 24, adapted to engage over the top edge of the bumper bar 14, as shown in Figure 4. The arms 15', 15' are formed inwardly of the brace webs 15, 15 with plain slots 25, 25 extending in the horizontal flanges 21 and in the vertical flanges 21' of the arms.

Figure 3:
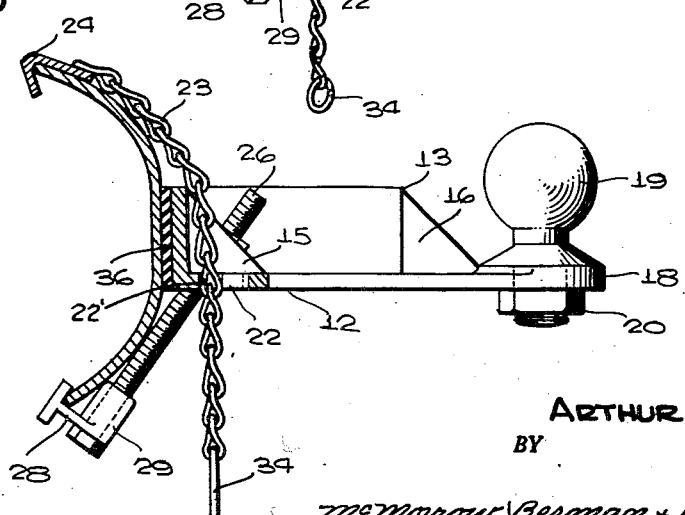
Figure 3 is an enlarged vertical cross sectional view taken on the line 3—3 of Figure 1.

Extending through the slots 25, 25 are bolts 26, 26, and engaged on the shanks of the bolts 26 adjacent the heads 27 on the lower ends thereof are flanged hook arms 28, 28 adapted to engage around the lower edge of the bumper bar 14, as shown in Figures 3 and 4, the arms 28 having sleeve portions 29 receiving the shanks of the bolts 26, said sleeve portions bearing against the heads 27 of the bolts. Designated at 30, 30 are respective bearing blocks engaged on the upper portions of the bolts and having arcuately curved bottom surfaces 30' engaging the top surfaces of the flanges 21 and the rear sides of the vertical flanges 21', said top surfaces and the flanges 21' being arcuately rounded, as shown at 31, 31 to receive the arcuate bearing surfaces of the blocks 30. Threadedly engaged on the upper portions of shanks of the bolts 26 are nuts 33, 33, which when tightened, cause the hook elements 28 to clampably engage the bottom edge of the bumper bar 14 and cause the hook elements 24, 24 of the chains 23 to clampably engage over the top edge of the bumper bar.

In installing the mount 11, the flanged hook elements 28, 28 are first engaged beneath the bottom edge of the bumper bar and the hook elements 24, 24 are engaged over the top edge of the bumper bar. The chains 23, 23 are then pulled down tight by means of rings 34 on their free ends through the large portions of the keyhole slots 22 and then lockingly engages in the narrow portions 22' of said keyhole slots. The bolts 26 are then tightened by tightening the nuts 33 thereon by the use of a suitable wrench or other suitable implement, whereby the mount is rigidly secured to the bumper bar.

The rings 34 are substantially larger in diameter than the largest dimension of the keyhole slots 22, whereby the chains 23 can never become completely disengaged from the main body 12, and loss of the chains 23 and the hook elements 24 is avoided.

Secured in any suitable manner to the forward sides of the vertical flanges 21' of the arms 15' are cushioning strips 36 of resilient deformable material, such as rubber or the like, which prevent marring of the rear surface of the bumper bar 14 when the mount 11 is secured thereon.

Referring now to Figures 5 to 8, 11' generally designates a modified form of hitch ball mount, comprising a pair of mount members 41, 41 which are adapted to be individually secured to the automobile bumper bar 14 and have respective rearwardly extending V-shaped portions 42 connected by a transverse bar 53. The transverse bar 53 has the hitch ball 43 secured on its intermediate portion between the members 41, 41, as shown in Figures 5, 6 and 7.

Each mount member 41 includes side arms 43', 43' having horizontal flanges 44, 44 formed with keyhole slots 45, 45. Each mount 41 is formed with vertical reinforcing flanges 46, 46 which extend along the flanges 44, 44 and the portion 42, and are secured to the vertical flanges 46′, 46′. The outer end of the V-shaped portion 42 is formed with an apertured boss 47 which receives the threaded stud 48. Welded to the top end of each stud 48 is a rectangular sleeve 49. A suitable fastening nut 50 is threadedly engaged on the lower portion of each stud 48 for securing each sleeve 49 to its associated boss 47.

The bar 53 has its end portions extending through sleeves 49 and is secured in the sleeves by respective set screws 50 threadedly engaged through the top walls of the sleeves and clampingly engaging the respective end portions of the bar 53.

The intermediate portion of each mount member 41 is formed with a slot 25, similar to the slot 25 in the embodiment illustrated in Figures 1 to 4, said slot being perpendicular to the length of the bracket 41. Extending through each slot 25 is a bolt 26 provided with a hook member 28 engageable with the bottom edge of the bumper bar 14. Engaged through the outer keyhole slots 45 of the mounts 41, 41 are chains 23, 23 provided at their top ends with hook elements 24, 24 adapted to engage the top edge of the bumper bar 14. Large rings 34 are provided on the bottom ends of the chains, as in the form of the invention shown in Figures 1 to 4. The chains 23 are lockingly engaged in the narrow portions of the keyhole slots 45 in the same manner as the chains 23 are lockingly engaged in the narrow portions of the keyhole slots 22 in the form of the invention of Figures 1 to 4.

Suitable cushioning strips 36′ of resilient deformable material are secured to the forward surfaces of the vertical flanges 46′ of the mounts 41, 41, whereby said cushioning strips 36′ are interposed between the mounts and the bumper bar 14 to protect the bumper bar against marring.

The arrangement illustrated in Figures 5, 6 and 7 is installed in substantially the same manner as that shown in Figures 1 to 4, the mounts 41, 41 being positioned on suitable points of the bumper bar 14. For example, the mounts 41, 41 may be located inwardly adjacent the respective bumper guards 60, 60 which may be present on the bumper bar 14. Adjustment of the mounts 41, 41 along the bar 53 to provide a desired spacing between the mounts 41, 41 is allowed by the provision of the locking screws 50, which may be loosened to permit the mounts to be adjusted along the bar 53 and which may then be tightened to lock the mounts in adjusted positions relative to each other.

Referring now to Figure 8, a single mount 41 by engaging the shank of the hitch ball 43 through the apertured boss 47 and securing the hitch ball to the boss by a nut threadedly engaged on the lower portion of the shank of the hitch ball. Respective chains 23, 23 may be engaged through the keyhole slots 45, 45 provided in the respective horizontal flanges 44, 44 of the arms of the bracket, the chains 23, 23 being provided with hook elements 24 on their top ends engageable with the top edge of the automobile bumper bar. The bolt 26 which extends through the slot 25 is provided with the hook element 28 having the sleeve portion 29 engaging the head 27 of the bolt, in the same manner as in the previously described forms of the invention. The nut 33 on the upper portion of the bolt bears against the bearing block 30, as in the other forms of the invention described herein, and may be tightened to lock the mount to the bumper bar after the chains 23, 23 have been manually adjusted and lockingly engaged in the narrow portions of the keyhole slots 45.

Cushioning strips of resilient deformable material, shown at 36′, and similar to those employed in Figures 5, 6 and 7 are also employed in the arrangement of Figure 8 to protect the bumper bar against surface marring.

While specific embodiments of the invention have been disclosed herein, it will be understood that various modifications within the spirit of the invention may occur to those skilled in the art. Therefore, it is intended that no limitations be placed on the invention except as defined by the scope of the appended claims.

What is claimed is:

1. In a trailer hitch ball mount for a bumper bar, a body having side arm portions comprising vertical flanges and horizontal flanges, said horizontal flanges having upper surfaces and said vertical flanges having forward and rear surfaces, a rearwardly projecting intermediate portion on said body between said side arms, said intermediate portion having a rear end on which a hitch ball is adapted to be secured, said horizontal flanges having keyhole slots therein comprising forward narrow slot portions and rearward larger portions, a plain slot in said body extending into a horizontal flange and a vertical flange, a bearing block having a lower surface and an upper surface, said bearing block being wider than said plain slot and having its lower surface bearing upon the upper surface of the horizontal flange and the rear surface of the vertical flange, a bolt having a shank traversing said block and extending through said plain slot, said bolt shank having a lower end having a head below said body and an upper end above said block, a hook element sleeved on the lower end of the shank for engaging the lower edge of a bumper bar, a nut on the upper end of the shank engaging the upper surface of the bearing block, chains having upper ends and lower ends, hook elements on the upper ends of the chains for engaging over the upper edge of a bumper bar, said chains depending through said keyhole slots with their lower ends below said body, and rings on the lower ends of the chains wider than the keyhole slots, said rearward larger portions of the keyhole slots being sufficiently large to freely pass the chains, the chains being adjustable and securably engaged in the narrow forward portions of the keyhole slots.

2. In a trailer hitch ball mount for a bumper bar, a body having a side arm comprising a vertical flange having a forward side and a rear side and a horizontal flange projecting rearwardly from said vertical flange, said horizontal flange having an upper surface, a plain slot extending in said horizontal flange and in said vertical flange, a bearing block bearing upon said upper surface and said rear surface in the region of said plain slot, a bolt having a shank traversing said bearing block and extending through said plain slot, said shank having an upper end above the bearing block and a lower end below said body, a hook member on the lower end of the shank, a nut on the upper end of the shank bearing upon said bearing block, a keyhole slot on said horizontal flange, said keyhole slot having a narrow forward portion and a wider rear portion, a chain freely passing through said wider portion of the keyhole slot and securably engageable in the narrow portion of the keyhole slot, said chain having an upper end having a hook element thereon above said body and a lower end below said body having a manual member thereon wider than said wider portion of the keyhole slot.

References Cited in the file of this patent

UNITED STATES PATENTS

| | | |
|---|---|---|
| 2,089,400 | Morris | Aug. 10, 1937 |
| 2,474,078 | Wilcox | June 21, 1949 |
| 2,488,415 | Klein | Nov. 15, 1949 |
| 2,542,907 | Dayton et al. | Feb. 20, 1951 |
| 2,585,768 | Ham | Feb. 12, 1952 |